United States Patent [19]
De Loor et al.

[11] Patent Number: 6,090,889
[45] Date of Patent: Jul. 18, 2000

[54] RUBBERY POLYMER WITH IMPROVED PROPERTIES

[75] Inventors: Agnes Marie Madeleine Louise De Loor, Montigny le Bretonneux; Francois Jean-Marie Breton, St Genis-Laval; Hung Dang Ngoc, Limeil Brevannes, all of France

[73] Assignee: The Goodyear Tire & Rubber Company, Akron, Ohio

[21] Appl. No.: 09/065,178

[22] Filed: Apr. 23, 1998

Related U.S. Application Data

[60] Provisional application No. 60/044,927, Apr. 25, 1997.
[51] Int. Cl.⁷ .................................................. C08L 31/00
[52] U.S. Cl. .................... 525/94; 525/233; 525/320.1; 525/331.8; 525/384
[58] Field of Search .......................... 525/94, 233, 329.1, 525/331.8, 384

[56] References Cited

U.S. PATENT DOCUMENTS 5,859,132  1/1999  Ngoc .......................................... 529/94

FOREIGN PATENT DOCUMENTS

| 0386507 | 9/1990 | European Pat. Off. | .......... C08F 8/14 |
| 0764689 | 3/1997 | European Pat. Off. | ......... C08L 33/08 |
| 0799856 | 10/1997 | European Pat. Off. | ........ C08L 33/08 |

*Primary Examiner*—Edward J. Cain
*Attorney, Agent, or Firm*—Alvin T Rockhill

[57] ABSTRACT

This invention discloses a rubbery polymer having improved properties which is comprised of repeat units which are derived from (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent; wherein a chemical agent or a copolymer containing hydroxyl groups, ester groups, amine groups or carboxylic acid groups is grafted onto said rubbery polymer. The grafting can be done in the presence or in the absence of a carrying polymer matrix which should be inert with regard to the grafting reaction. Fatty alcohols and ethylene vinyl acetate are representative examples of agents which can be grafted onto the rubbery polymer.

23 Claims, No Drawings

RUBBERY POLYMER WITH IMPROVED PROPERTIES

This application claims the benefit of U.S. Provisional Application 60/044,927 filed Apr. 25, 1997.

BACKGROUND OF THE INVENTION

Automotive instrument panels and door panels are typically composites which are made of a rigid backing which supports a semi-rigid urethane foam with the semi-rigid urethane foam being covered with a skin compound. Such skin compounds are typically blends of polyvinyl chloride (PVC) with a nitrile rubber (NBR). The nitrile rubber is included in such blends as a permanent modifier for the PVC which provides it with a higher degree of flexibility.

The automotive industry is currently moving toward more aerodynamic body designs which typically include larger glass areas. Such design changes have significantly increased the heat and ultraviolet light aging requirements of automotive interiors. This has in turn significantly increased the demands put upon the polymers which are utilized as skins in automotive interior panels.

Heat and light stabilizers can be employed to improve the heat and ultraviolet light aging characteristics of conventional PVC/NBR blends which are utilized as skins for automotive interior panels. However, the degree to which the aging characteristics of such blends can be improved by the addition of additives is limited. In fact, there is a demand for performance characteristics in such applications which heretofore has not been realized by the utilization of heat and light stabilizers. For instance, it would be highly desirable for the skins used in automotive panels to resist discoloration and cracking under conditions of high heat and intense ultraviolet light throughout the life of the vehicle.

NBR/PVC blends offer an array of physical properties which make them useful as a skin composition for automotive panels. The NBR acts as a permanent flexibilizing monomer for the PVC. It also acts as a shrinkage control agent, and embossing aid, and improves grain retention. The NBR in such blends further provides vacuum forming gauge control and exhibits low fog characteristics. NBR is highly compatible with PVC and has the capability of being recycled. It is essential for any polymer which is substituted for NBR to display these essential characteristics.

U.S. Pat. No. 5,380,785 discloses a rubbery polymer which can be blended with PVC to make leathery compositions. These compositions are particularly useful in manufacturing skins for automotive interior paneling. Skin compositions which are made utilizing this rubbery polymer provide a higher level of resistance to heat and ultraviolet light than those made utilizing conventional NBR/PVC blends. The rubbery polymers of U.S. Pat. No. 5,380,785 also offer low fog characteristics, low odor, shrinkage control and grain retention. They also act as an embossing aid and as a permanent flexibilizing modifier. These rubbery polymers also have characteristics which make them useful in building gasket applications.

U.S. Pat. No. 5,380,785 also specifically discloses a rubbery polymer which can be blended with polyvinyl chloride to make leathery compositions having good heat and ultraviolet light resistance, said rubbery polymer being comprised of repeat units which are comprised of (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a half ester maleate soap and (f) a crosslinking agent. Polymers of this general type are sold by The Goodyear Tire & Rubber Company as Sunigum® rubber.

In Rapra Review Reports 73, Volume 7, No. 1, 1994, M W R Brown et al classified reactive processing methods into two groups:

(1) Methods where some form of polymerization or chain extension chemistry takes place during the making of an article, for example, reaction injection molding (RIM), reinforced reaction injection molding (RRIM), structural reaction injection molding (SRIM) and resin transfer molding (RTM).

(2) Methods where processing equipment, such as an extruder, is used for (a) the chemical modification of polymers, where the aim is to produce new or modified polymers or polymer blends or (b) the synthesis of polymers; i.e., materials which might be suitable for other different manufacturing methods such as injection molding.

The RIM, RRIM, SRIM and RTM methods are batch-molding process, while the REX (reactive extrusion) methods are continuous. The extruder can be regarded as some form of continuous chemical or polymerization reactor, where the reactants remain in the liquid or melt state inside the extruder; the final product only becoming solid after it has been cooled on emerging from the extruder.

SUMMARY OF THE INVENTION

The present invention discloses a process for preparing a rubbery polymer having improved properties, said process comprising the steps of (1) polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile and (d) a crosslinking agent under emulsion polymerization conditions to produce a seed polymer containing latex; (2) adding (a) styrene, (b) additional acrylonitrile and (c) additional crosslinking agent to the seed polymer containing latex under emulsion polymerization conditions which result in the formation of an emulsion containing the rubbery polymer; (3) recovering the rubbery polymer from the emulsion containing the rubbery polymer; (4) adding (a) a condensation reaction catalyst and (b) a chemical or a (co)polymer containing hydroxyl groups, ester groups, amine groups or carboxylic acid groups to the rubbery polymer to produce a reactive mixture; and (5) mixing the reactive mixture for at least 1 minute at a temperature which is within the range of about 100° C. to about 300° C.

The present invention further discloses a process for preparing a rubbery polymer having improved properties, said process comprising grafting a chemical or a (co)polymer containing hydroxyl groups, ester groups, amine groups or carboxylic acid groups onto a rubbery polymer which is comprised of repeat units which are derived from (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate, and ethyl acrylate, (c) acrylonitrile, (d) styrene and (e) a crosslinking agent; wherein said grafting reaction is carried out under conditions of reactive processing for a period of at least about 1 minute at a temperature which is within the range of about 100° C. to about 300° C.

The present invention also reveals a rubbery polymer having improved properties which is comprised of repeat units which are derived from (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate, and ethyl acrylate, (c) acrylonitrile, (d) styrene and (e) a crosslinking agent; wherein a chemical or a (co)polymer containing hydroxyl group, ester group, amine group or acid group is grafted onto said rubbery polymer.

The subject invention further reveals a process for preparing a rubbery polymer having improved properties, said process comprising the steps of (1) polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile and (d) a crosslinking agent under emulsion polymerization conditions to produce a seed polymer containing latex; (2) adding (a) styrene, (b) additional acrylonitrile and (c) additional crosslinking agent to the seed polymer containing latex under emulsion polymerization conditions which result in the formation of an emulsion containing the rubbery polymer; (3) recovering the rubbery polymer from the emulsion containing the rubbery polymer; (4) adding (a) a condensation reaction catalyst and (b) a member selected from the group consisting of fatty alcohols and ethylene vinyl acetate polymers to the rubbery polymer to produce a reactive mixture; and (5) 5 mixing the reactive mixture for at least 1 minute at a temperature which is within the range of about 100° C. to about 300° C.

The present invention also reveals a process for preparing a rubbery polymer having improved properties, said process comprising grafting a fatty alcohol or a ethylene vinyl acetate polymer onto a rubbery polymer which is comprised of repeat units which are derived from (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent; wherein said grafting reaction is carried out under conditions of reactive processing for a period of at least about 1 minute at a temperature which is within the range of about 100° C. to about 300° C.

The subject invention further discloses a rubbery polymer having improved properties which is comprised of repeat units which are derived from (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, and (e) a crosslinking agent; wherein a fatty alcohol or ethylene vinyl acetate is grafted onto said rubbery polymer.

DETAILED DESCRIPTION OF THE INVENTION

The rubbery polymers, which can be modified by utilizing the techniques of this invention, are sold by The Goodyear Tire & Rubber Company as Sunigum® rubber. These rubbery polymers are synthesized utilizing a free radical emulsion polymerization technique and are comprised of repeat units which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene and (e) a crosslinking agent. The crosslinking agent is typically a multi-functional acrylate, a multi-functional methacrylate or divinylbenzene. Some specific examples of crosslinking agents which can be used include ethylene glycol methacrylate, divinylbenzene and 1,4-butanediol dimethacrylate.

Technically, such rubbery polymers contain repeat units (chain linkages) which are derived from (a) butyl acrylate, or optionally a mixture of butyl acrylate and 2-ethylhexyl acrylate containing up to about 40 percent 2-ethylhexyl acrylate, (b) methyl methacrylate, ethyl methacrylate, methyl acrylate or ethyl acrylate, (c) acrylonitrile, (d) styrene and (e) (f) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers, in actuality means that it contains repeat units which are derived from those monomers.

The rubbery polymers which are modified in accordance with this invention will normally contain (a) from about 40 weight percent to about 80 weight percent butyl acrylate, or optionally a mixture of butyl acrylate and 2-ethylhexyl acrylate containing up to 40 weight percent 2-ethylhexyl acrylate, (b) from about 5 weight percent to about 35 weight percent methyl methacrylate, ethyl methacrylate, methyl acrylate or ethyl acrylate, (c) from about 4 weight percent to about 30 weight percent acrylonitrile, (d) from about 3 weight percent to about 25 weight percent styrene and (e) from about 0.25 weight percent to about 8 weight percent of a crosslinking agent.

Such rubbery polymers will preferably contain (a) from about 50 weight percent to about 80 weight percent butyl acrylate, or optionally a mixture of butyl acrylate and 2-ethylhexyl acrylate containing up to about 40 percent 2-ethylhexyl acrylate, (b) from about 3 weight percent to about 25 weight percent of at least one member selected from the group consisting of methyl methacrylate, ethyl methacrylate, methyl acrylate and ethyl acrylate, (c) from about 6 weight percent to about 30 weight percent acrylonitrile, (d) from about 5 weight percent to about 18 weight percent styrene and (e) from about 0.5 weight percent to about 4 weight percent of a crosslinking agent.

The rubbery polymer will more preferably be comprised of repeat units which are derived (a) from about 55 weight percent to about 75 weight percent butyl acrylate, or optionally a mixture of butyl acrylate and 2-ethylhexyl acrylate containing up to about 40 percent 2-ethylhexyl acrylate, (b) from about 5 weight percent to about 20 weight percent of at least one member selected from the group consisting of methyl methacrylate, ethyl methacrylate, methyl acrylate and ethyl acrylate, (c) from about 10 weight percent to about 25 weight percent acrylonitrile, (d) from about 8 weight percent to about 14 weight percent styrene, and (e) from about 1 weight percent to about 3 weight percent of a crosslinking agent. The percentages reported in this paragraph are based upon the total weight of the rubbery polymer.

The rubbery polymers, which are modified in accordance with the process of present invention, are synthesized in an aqueous reaction mixture by utilizing a free radical polymerization technique. The reaction mixture utilized in this polymerization technique is comprised of water, the appropriate monomers, a suitable free radical initiator, a crosslinking agent and a soap. It is often preferred to utilize a metal salt of an alkyl sulfonate or a metal salt of an alkyl sulfate as the soap. The reaction mixture utilized in this polymerization technique will normally contain from about 10 weight percent to about 80 weight percent monomers, based upon the total weight of the reaction mixture. The reaction mixture will preferably contain from about 20 weight percent to about 70 weight percent monomers and will more preferably contain from about 40 weight percent to about 50 weight percent monomers.

The reaction mixtures utilized in carrying out such polymerizations can contain from about 0.005 phm (parts per hundred parts of monomer by weight) to about 1 phm of at least one member selected from the group consisting of metal salts of alkyl sulfates and metal salts of alkyl sulfonates. It is more typical for the reaction mixture to contain from about 0.008 phm to about 0.5 phm of the metal salt of the alkyl sulfonate or the metal salt of the alkyl sulfate. It is normally more typical for the reaction mixture to contain from about 0.05 phm to about 0.3 phm of the metal salt of the alkyl sulfonate or the metal salt of the alkyl sulfate.

The free radical polymerization technique utilized in this synthesis is normally initiated by including a free radical initiator in the reaction mixture. Virtually, any type of compound capable of generating free radicals can be utilized as the free radical initiator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-methane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butyl-peroxy)butane, and the like. Water-soluble peroxygen-free radical initiators are especially useful in such aqueous polymerizations.

The emulsion polymerization utilized in the synthesis of the rubbery polymer is typically carried out at a temperature which is within the range of about 10° C. to about 95° C. At temperatures above about 88° C., alkyl acrylate monomers, such as butyl acrylate, have a tendency to boil. Thus, a pressurized jacket is required for heating in cases where alkyl acrylate monomers are polymerized at temperatures in excess of about 80° C. Thus, in most cases, the polymerization temperature utilized will vary between about 20° C. and about 80° C. On the other hand, at polymerization temperatures of less than about 55° C., a redox initiator system is required to insure satisfactory polymerization rates.

The sulfonate surfactants that are useful in such emulsion polymerizations are commercially available from a wide variety of sources. For instance, Du Pont sells sodium alkylarylsulfonate under the tradename Alkanol™, Browning Chemical Corporation sells sodium dodecylbenzene sulfonates under the tradename Ufaryl™ DI-85 and Ruetgers-Nease Chemical Company sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

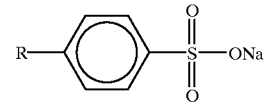

wherein R represents an alkyl group containing from 1 to about 20 carbon atoms. It is preferred for the alkyl group to contain from about 8 to about 14 carbon atoms.

The polymerization is carried out as a two-step batch process. In the first step, a seed polymer containing latex is synthesized. This is done by polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile and (d) a crosslinking agent.

The seed polymer containing latex is typically prepared by the polymerization of a monomer mixture which contains about 40 to about 90 weight percent butyl acrylate, or optionally a mixture of butyl acrylate and 2-ethylhexyl acrylate containing up to about 40 percent 2-ethylhexyl acrylate, from about 5 to about 35 weight percent methyl methacrylate, ethyl methacrylate, methyl acrylate or ethyl acrylate, from about 2 to about 30 weight percent acrylonitrile, and from about 0.25 weight percent to 6 weight percent of the crosslinking agent. It is typically preferred for the monomeric component utilized in the first step to include about 50 weight percent to about 85 weight percent butyl acrylate, or optionally a mixture of butyl acrylate and 2-ethylhexyl acrylate containing up to about 40 percent 2-ethylhexyl acrylate, from about 5 weight percent to about 30 weight percent ethyl acrylate, ethyl methacrylate, methyl acrylate or methyl methacrylate, from about 4 weight percent to about 28 weight percent acrylonitrile, and from about 0.5 weight percent to about 4 weight percent of the crosslinking agent. It is generally more preferred for the monomer charge composition used in synthesizing the seed polymer latex to contain from about 60 weight percent to about 80 weight percent butyl acrylate, or optionally a mixture of butyl acrylate and 2-ethylhexyl acrylate containing up to about 40 percent 2-ethylhexyl acrylate, from about 5 weight percent to about 25 weight percent methyl methacrylate, ethyl methacrylate, methyl acrylate or ethyl acrylate, from about 5 weight percent to about 25 weight percent acrylonitrile, and from about 1 to about 3 weight percent crosslinking agent.

After the seed polymer latex has been prepared, styrene monomer, additional acrylonitrile monomer and additional crosslinking agent is added to the seed polymer containing latex. As a general rule, from about 4 parts by weight to about 30 parts by weight of styrene, from about 1 part by weight to about 20 parts by weight of additional acrylonitrile, and from about 0.01 to 2 parts by weight of the crosslinking agent will be added. In this second stage of the polymerization, it is preferred to add from about 6 parts by weight to about 22 parts by weight of styrene, from about 3 parts by weight to about 12 parts by weight of acrylonitrile, and from about 0.05 parts by weight to 1 part by weight of the crosslinking agent. It is typically more preferred for from about 10 parts by weight to about 17 parts by weight of styrene, from about 4 parts by weight to about 8 parts by weight of acrylonitrile, and from about 0.1 parts by weight to about 0.5 parts by weight of the crosslinking agent to be added to the seed polymer latex to initiate the second phase of the polymerization.

A wide variety of crosslinking agents can be utilized in carrying out the polymerizations to produce the rubbery polymer. Some representative examples of crosslinking agents which can be utilized include difunctional acrylates, difunctional methacrylates, trifunctional acrylates, trifunctional methacrylates and divinylbenzene. Of these, 1,4-butanediol dimethacrylate has proven to be particularly useful as the crosslinking agent.

In most cases, the polymerization will be continued until a high monomer conversion has been attained. At this point, the rubbery polymer made by the two-step batch polymerization process is recovered from the emulsion (latex). This can be accomplished by utilizing standard coagulation techniques. For instance, coagulation can be accomplished by the addition of salts, acids or both to the latex.

After the rubbery polymer is recovered by coagulation, it is dried. It is sometimes advantageous to convert the rubbery polymer into a powder to facilitate its usage. In this case, it will be beneficial to add a partitioning agent to the rubbery polymer. Some representative examples of partitioning agents which can be employed include calcium carbonate, emulsion polyvinyl chloride and silica. Calcium carbonate is a highly desirable partitioning agent which can be utilized in such applications.

The rubbery polymer is modified in accordance with this invention by a reactive processing technique. In this process, the chemical agent or polymer containing hydroxyl groups, ester groups, amine groups or carboxylic acid groups, such as a fatty alcohol or an ethylene vinyl acetate polymer, is mixed into the rubbery polymer for a period of at least about 1 minute at a temperature which is within the range of about 100° C. to about 300° C. This reactive processing step can be carried out in an extruder. In other words, reactive extrusion techniques where the rubbery polymer reacts with the chemical agent or polymer containing hydroxyl groups, ester groups, amine groups or carboxylic acid groups, such as a fatty alcohol or an ethylene vinyl acetate polymer, during extrusion can be employed.

A wide variety of chemical agents and polymers which contain one or more hydroxyl groups which are reactive with the alkyl ester groups on the rubbery polymer can be grafted onto the rubber polymer in order to improve low temperature properties or compatibility with other polymers. Fatty alcohols which contain only one hydroxyl group are representative examples of agents which are useful for this purpose. Some representative examples of monoalcohols which can be utilized include 1-Pentanol, 2-Pentanol, 3-Pentanol, 2-Methyl-1-butanol, 3-Methyl-1-butanol, 2-Methyl-2-butanol, 3-Methyl-2-butanol, 2,2-Dimethyl-l-propanol, 1-Hexanol, 2-Methyl-1-pentanol, 4-Methyl-1-pentanol, 4-Methyl-2-pentanol 2-Ethyl-1-butanol, 1-Heptanol, 2-Heptanol, 3-Heptanol, 4-Heptanol, 2,4-Dimethyl-3-pentanol, 1-Octanol, 2-Octanol, 2-Ethyl-1-hexanol, 3,5-Dimethyl-1-hexanol, 2,2,4-Trimethyl-1-pentanol, 1-Nonanol, 5-Nonanol, 3,5-Dimethyl-4-heptanol, 2,6-Dimethyl-4-heptanol, 3,5,5-Trimethyl-1-hexanol, 1-Decanol, 1-Undecanol, 1-Dodecanol, 2,6,8-Trimethyl-4-nonanol, 1-Tridecanol, 1-Tetradecanol, 1-Pentadecanol, 1-Hexadecanol, 1-Heptadecanol, 1-Octadecanol, 1-Nonadecanol, 1-Eicosanol 1-Hexacosanol, and the like.

Polyols can also react with the rubbery polymer to crosslink it and improve its compression set. Some polyols can be used include 1,4-butanediol, 1,2-butanediol, 1,3-butanediol, 1,5-pentanediol, 1,6-hexanediol, 2,5-hexanediol, 1,2-hexanediol, 2,2,4-trimethyl-1,3-pentanediol, 1,2-octanediol, 1,2-decanediol, 1,2-dodecanediol, 1,2-tetradecanediol, 1,2-hexadecanediol, 1,2-octadecanediol, 2,2-dimethyl-1,3-propanediol, neopentyl glycol, hydroxypivalic acid neopentyl glycol ester, 2-methyl-2-propyl-1,3-propanediol, 2-butyl-2-propyl-1,3-propanediol, 2-sec-butyl-2-methyl-1,3-propanediol, 3-hexyne-2,5-diol, pentaerythritol, dipentaerythritol, tripentaerythritol, 2,5-dimethyl-3-hexyne-2,5-diol, 1,10-decanediol, 2,2-bis(4-hydroxycyclohexyl)-propane, 1,4-bis (hydroxymethyl)cyclohexane, 2,2,4-trimethyl-1,3-pentanediol, 1,2-pentanediol, 2,3-dimethyl-2,3-butanediol, 1,2,4-butanetriol trimethylolpropane, and the like.

With the same type of reaction, in order to improve compression set and/or to compatibilize Sunigum® rubbers with other polymers, polymers containing hydroxyl groups could be employed, such as polyvinylalcohols, like Airvol from Air Products and Chemicals, Elvanol from DuPont, CCP from Chang Chun, Mowiol from Hoechst, Poval from Kuraray, Gohsenol from Nippon Goshei, Polyviol from Wacker, Caradol from Shell and Hydroxyethylcellulose and all the hydroxyalkylmethylcelluloses, homo or copolymers of hydroxyethylacrylate or hydroxyethyl methacrylate, hydroxyethylstarch, copolymers of Hydroxyl hexafluoroisopropylstyrene, N-hydroxymethyl acrylamide, 5-hydroxymethyl-2-furanacrylic esters, hydroxyalkylmethacrylate(s), hydroxypropylstarch, hydroxyalkylmethacrylamides, hydroxytelechelic polybutadiene, such as Poly Bd from Elf Atochem and EVOH (Soarnol from Elf Atochem).

Diol containing compounds, such as the polyols listed above, could be used to crosslink Sunigum® rubber with polymers containing ester functions, like acrylates, in order to improve compression set or to compatibilize it with other polymers. For example, polymethacrylates, ethylene-methyl, ethyl or butyl acrylate copolymers (EMA or EBA like Lotryl or Lotader from Elf Atochem, Luran or Lucalen from BASF, Europrene AR or cyanacric from Enichem, Diakon or Avron from ICI, Nipol or Nipolar from Nippon Zeon, Vamac from Dupont, Hycar from Goodrich, Cyanacryl from American Cyanamid, Elaprim from ENI, Acron from TOA Paint, Noxtite from Nippon Oil Seal-NOK, JSR AR from Japan Synthetic Rubber Co.), PVC-methyl, ethyl or butyl acrylate copolymers (Vinnolit VK 710, Solvic from Solvay, Lacovyl from Elf Atochem, Vinidur from BASF), Goodyear resins (Pliolite AC4, AC80, Plioway) and polymethacrylates (Lucryl from BASF, Altuglas from Elf Atochem) could be employed.

To improve flame retardancy, it is possible to graft a phosphate onto the rubbery polymer by the use of a dialkyl phosphate which contains an hydroxyl group, for example bis(2-ethylhexyl)phosphate, or a trialkyl phosphate with an hydroxyl function on one or more alkyl or aryl functions.

Examples of this type of chemical compounds are: aminoethylphosphonic acid, adenosine mono, di or tri phosphate, chloroethyl phosphonic acid, bis(diethoxyphosphoryl) calixarene, bis(4-nitrophenyl) hydrogen phosphate, bis(2-ethylhexyl) hydrogen phosphate, dibenzyl phosphate, Cytidene monophosphoric acid, binaphthyl diyl hydrogen phosphate, diethyl phosphate, diphenyl phosphate, diphenyl phosphonic acid, flavine-adenine dinucleotide, (2-hydroxybenzyl) triphenyl phosphonium bromide, (o-hydroxybenzoyl) methylene triphenylphosphorane, 4-nitrophenylphosphate, pyridoxal 5 phosphate, phosphoenol pyruvic acid, monopotassium salt, 4-nitrophenyl phosphate bis(2-amino 2-ethyl 1,3 propane diol), 4-nitrophenyl phosphate di (cyclohexylamine) salt, hydroxyphenyl diacetate phosphate and hydroxyphenyl diethyl phosphate.

Two ester groups can exchange their alkyl groups by transesterification using a catalyst. Using this technique, polymers containing vinyl ester groups can be crosslinked with the rubbery polymer in order to improve the compression set or to compatibilize it with other polymers. Some examples of these polymers are ethylene-vinyl acetate copolymers (Evatanes or Orevac from Elf Atochem, Elvax from Dupont, Greenflex from Enichem, Lucalen from BASF, Levapren from Bayer, Vynathene from US Ind. Chemicals and Escorene from Exxon), PVC-vinyl acetate copolymers or graft polymers, or polymers vinyl esters (VeoVa from Shell, Nakan, Sunprene or Lucorex from Elf Atochem).

Polyesters, such as polyethyleneterephtalate, like Cleartuf® from Shell Chemical and polybutylene terephtalate like Arnite and Arnitel from DSM, Crastin from Ciba Geigy, Orgater from Elf Atochem, Pibiter, Lighter, Vivypak from Enichem, Ultradur and Palatal from BASF, Pocan from Bayer, Rynite, Voranol, Crastin, Hytrel from Dupont, Impet, Celanex, Vanoar from Hoechst, Melinar from ICI, Valox from GE Plastics, Vestidur from Hüls or polyester resins from Neste, polycaprolactones (Capa from Solvay) and polycarbonates (Sinvet from Enichem, Apec and Makrolon from Bayer, Lexan from GE Plastics, Calibre from Dow) could be grafted on the Sunigum with the same type of reactions.

The acylation of NH groups occurs quite readily. The most common acylating agents are acyl halides, esters, anhydrides and carboxylic acids. In addition to amines, many other compounds containing NH groups can be acylated. At high enough temperatures, even diacylation (for example, with primary amines) is possible. However, secondary amines react much more slowly than primary ones.

Acylation at the nitrogen atom often proceeds satisfactorily without a catalyst. This is the case for some NH derivatives, particularly those negatively substituted, because they are so highly nucleophilic. Common catalytic procedures, if used, involve alkoxides (with esters as alkylating agents), sulfuric or phosphoric acid (with anhydrides or carboxylic acids), and aqueous alkali (with aroyl halides, Schotten-Baumann reaction).

Esters have found wide applications. They are especially suitable if the alcohols formed boil at lower temperatures than the N derivatives, thus removing the alcohol from the equilibrium.

Reaction with an amine compound could compatibilize the rubbery polymer with polyamides. Examples of amino compounds that can be used include ethylamine, diethylamine, propylamine, dipropylamine, isopropylamine, diisopropylamine, butylamine, dibutylamine, isobutylamine, diisobutylamine, 1-methylpropylamine, bis (1-methyl)propylamine, 1,1-dimethylamine, pentylamine, dipentylamine, 1-methylbutylamine, 3-methylbutylamine, bis(3-methylbutylamine), hexylamine, octylamine, 2-ethylhexylamine, decylamine, N-methylbutylamine, N-ethylbutylamine, allylamine, diallylamine, 3-methoxypropylamine, octylamine, decylamine, dodecylamine, tetradecylamine, hexadecylamine, octadecylamine and docosylamine.

Some commercial mixtures of primary amines can be used such as Coco amine, Oleylamine, Tallow amine, Hydrogenated-tallow amine and Soya amine. Aromatic compounds are also useful, such as 4-Aminobiphenyl, Aniline, Anisidine, Bensidine, N,N-Dimethylaniline, Diphenylamine, N-isopropylaniline, N-Methylaniline, 4,4'-Methylenedianiline, 2-Naphthylamine, p-Nitroaniline, N-Phenyl-2-naphthylamine, p-Phenylenediamine, o-Tolidine, o-Toluidine, Triphenylamine and m-Xylene-$\alpha$-$\alpha$'-diamine.

Reactions with diamines lead to crosslinking of the rubbery polymer. Thus, diamines can be used to improve compression set. Some representative examples of compounds containing two or more amino groups which can be grafted onto the rubbery polymer include: ethylene diamine, diaminopropane compounds, 1-amino-3-methylaminopropane, 1-amino-3-dimethylaminopropane, 1-amino-3-diethylaminopropane, 1-amino-3-cyclohexylaminopropane, diamino butane compounds, diamino pentane, 1-diethylamino 4 aminopentane, hexamethylene diamine, diaminooctane, diaminodecane, diethylenetriamine, triethylenetetramine, tetraethylene pentamine, dipropylene triamine, N, N'-bis(3-aminopropyl)-1,2-diaminoethane, 3-(2-aminoethyl) aminopropylamine and N-methyl-dipropylenetriamine.

Polymers containing amino groups can also react with the rubbery polymer in order to compatibilize it, for example, amine terminated polyamide or amine terminated nitrile rubber, such as Hycar from Goodrich.

During the reactive processing step, the alkyl group of the ester on the rubbery polymer reacts with hydroxyl groups, ester groups, amine groups or carboxyl groups on the chemical agent or polymer being grafted onto the rubbery polymer. For instance, hydroxyl groups on a fatty alcohol or acetate groups on an ethylene vinyl acetate can react with the rubbery polymer via a condensation reaction. This condensation reaction evolves a highly volatile compound, such as water, and covalently bonds the chemical agent or polymer such as the fatty alcohol or ethylene vinyl acetate polymer to the rubbery polymer. In other words, the chemical agent or the polymer become grafted onto the rubbery polymer.

To facilitate this condensation reaction, the reactive processing step will be carried out in the presence of a condensation reaction catalyst. The condensation catalyst will typically be a protonic acid (such as sulfuric acid, perchloric acid, p-toluenesulfonic acid and molecular sieves), but the majority of catalysts are metallic compounds. Alkali or alkoxide metals (mainly sodium or magnesium), titanium (IV) alkoxides or complexes of triphenyl phosphine with trialkyltin alkoxides or with copper alkoxides, glycol-soluble salts of $Zn^{2+}$, $Mn^{2+}$, $Co^{2+}$, $Ca^{2+}$, tributyltin methoxide, dioctyltin, ter(butoxide)titanate, trioctylytrium, manganese acetoxide, with antimony oxide, lead, zinc, magnesium, cobalt, manganese acetates or mixture of magnesium, manganese and zinc acetates are some examples of known catalysts.

Titanates are used to produce a wide range of esters (for example higher acrylates and methacrylates from readily available methyl acrylate and methacrylate respectively). Examples of these compounds are Tilcoms®, such as Tilcom TITP (tetraisopropyltitanate), Tilcom TMT (tetramethyltitanate) and Tilcom BIP.

The catalysts can be a dialkyltin oxide or dialkyltin dichloride, such as dibutyltindilaurate or dibutyltin oxide. Ciba-Geigy produces many types of organotin compounds under the trade name Irgastab®, such as Irgastab T161, 17MOK, DBTL, 17M, T22M, T196, T197, T200, T201, T2IS, T4, T7, T7LS, T9, T150, DBTM, T634, T6LS, TK262GV, TK263, T68, T36, 17MOK, 17MOL, T267, T269, T216, T682, DOTM, T650 and T41M; Akcros produces organotins compounds under the trade name Tinstab®, Barlocher produces organotins under the trade name Okstan® and Hoechst sells organotins compounds under the trade name Hostastab®.

The reactive processing step will preferably be carried out at a temperature which is within the range of about 100° C. to about 300° C. and will most preferably be carried out at a temperature which is within the range of about 120° C. to about 250° C. The reactive processing step will preferably be carried out for a period of about 1 minute to about 60 minutes. It is typically most preferred for the reactive processing step to be carried out over a period of about 3 minutes to about 30 minutes.

The graft polymers produced by the reactive processing step exhibit improved properties, such as hardness, tensile characteristics, elongation, modulus, low temperature properties, flame retarding behavior, compression set behavior, compatibility behavior, abrasion resistance, adhesion characteristics, thermoformability characteristics and impact resistance. For instance, rubbery polymers which are modified with fatty alcohols utilizing the technique of this invention are less brittle at low temperatures and can have improved elongation properties. Rubbery polymers which are modified with ethylene vinyl acetate also have improved tensile properties and vacuum thermoformability characteristics. These polymers are accordingly of added value in applications where such characteristics are being sought; for instance, window gasketing automotive applications and roofing applications.

Generally from about 1 phr to about 200 phr of the chemical agent or functional group containing polymer will be utilized to modify the rubbery polymer. More typically the rubbery polymer will be modified with about 5 phr to about 100 phr of the chemical agent or the functional group containing polymer. In cases where ethylene vinyl acetate polymers containing 5 percent to 70 percent vinyl acetate are employed to modify the rubbery polymer, it is normally preferred to utilize from about 5 phr to about 95 phr of the ethylene vinyl acetate polymer in the total weight of the reactive mixture for the modification procedure.

The reactive processing can be done in presence or in absence of a carrying polymer matrix which should be inert with respect to the condensation reaction. Many carrying polymer matrices can be used, such as polyolefins (or derived polyolefins) and their copolymers, halogen containing polymers (including PVC), polyamides, styrenic polymers, such as SEBS, SBS, SBR or ABS. The percentage of carrying polymer can be varied from 5 percent to about 95 percent of the total weight of both the carrying polymer and the reactive mixture.

The improved rubbery polymers of this invention can be blended subsequently with polyvinylchloride to make leather-like compositions. These leathery compositions offer an excellent combination of properties for utilization in making skin compounds for panels used in automotive applications. These leathery compositions can be prepared by blending the rubbery polymer into polyvinylchloride (PVC) utilizing standard mixing techniques. It is highly preferred for the improved rubbery polymer of this invention to be in powdered form when blended into PVC to make such leathery compositions.

A wide variety of plasticizers which are compatible with the polyvinyl chloride resins can be employed. Some representative examples of plasticizers which are highly suitable for this application include abietic derivatives, such as hydroabietyl alcohol, methyl abietate and hydrogenated methyl abietate; acetic acid derivatives, such as cumylphenyl acetate; adipic acid derivatives, such as benzyloctyl adipate, dibutyl adipate, diisobutyl adipate, di-(2-ethylhexyl) adipate, diisononyl adipate, diisooctyl adipate, dinonyl adipate, $C_{7-9}$ linear adipate, dicapryl adipate, octyl decyl adipate (n-octyl, n-decyl adipate), straight chain alcohol adipate, didecyl adipate (diisodecyl adipate), dibutoxyethyl adipate, high molecular weight adipate, polypropylene adipate, modified polypropylene adipate; azelaic acid derivatives, such as dicyclohexyl azelate, di-(2-ethylhexyl) azelate, di-n-hexyl azelate, low temperature plasticizer, diisooctyl azelate; benzoic acid derivatives such as diethylene glycol dibenzoate, dipropylene glycol dibenzoate, diethylene glycol benzoate and dipropylene glycol benzoate blend, proprietary low stain, neopentyl glycol dibenzoate, glyceryl tribenzoate, trimethylolethane tribenzoate, pentaerylthritol tribenzoate, cumylphenyl benzoate; polyphenyl derivatives such as hydrogenated terphenyl; citric acid derivatives, such as triethyl citrate, tri-n-butyl citrate, acetyl triethyl citrate, acetyl tri-n-butyl citrate, acetal tributyl citrate; epoxy derivatives such as butyl epoxy stearate, epoxy-type plasticizer, epoxy-type plasticizer tallate, alkyl epoxy stearate, epoxidized butyl ester, epoxidized octyl tallate, epoxidized soybean oil, epoxidized triglyceride, epoxidized soya bean oil, epoxidized sunflower oil, epoxidized-type plasticizer, epoxidized linseed oil, epoxidized tallate ester, 2-ethylhexyl-epoxy tallate, octyl epoxy stearate; proprietary esters such as proprietary ester and mixed ester; ether derivatives, such as cumylphenyl benzyl ether; formal derivatives such as butyl carbitol formal; fumaric acid derivatives, such as dibutyl fumarate, diisooctyl fumarate, dioctyl fumarate; glutaric acid derivatives such as mixed dialkyl glutarates and dicumylphenyl glutarate; glycol derivatives such as diethylene glycol dipelargonate, triethylene glycol dipelargonate, triethylene glycol di-(2-ethylbutyrate), triethylene glycol di-caprylatecaprate, triethylene glycol di-(2-ethylhexoate), triethylene glycol dicaprylate, tetraethylene glycol dicaprylate, polyethylene glycol di-(2-ethylhexoate), butyl phthalyl butyl glycolate, triglycolester of vegetable oil fatty acid, triethylene glycol ester of fatty acid; linear dibasic acid derivatives such as mixed dibasic ester; petroleum derivatives such as aromatic hydrocarbons; isobutyric acid derivatives such as 2,2,4-trimethyl-1,3-pentanediol diisobutyrate; isophthalic acid derivatives such as di(2-ethylhexyl) isophthalate, diisooctyl isophthalate, dioctylisophthalate; lauric acid derivatives such as butyllaurate, 1,2-propylene glycol monolaurate, ethylene glycol monoethyl ether laurate, ethylene glycol monobutyl ether laurate, glycerol monolaurate, polyethylene glycol-400-dilaurate; mellitates such as n-octyl, n-decyl trimellitate, tri-n-octyl-n-decyl trimellitate, triisononyl trimellitate, triisooctyl trimellitate, tricapryl trimellitate, diisooctyl monoisodecyl trimellitate, triisodecyl trimellitate, tri($C_{7-9}$ alkyl) trimellitate, tri-2-ethylhexyl trimellitate; nitrile derivatives such as fatty acid nitrile; oleic acid derivatives such as butyl oleate, 1,2-propylene glycol mono oleate, ethylene glycol monobutyl ether oleate, tetrahydrofurfuryl oleate, glyceryl monoleate; paraffin derivatives such as chlorinated paraffins, diethylene glycol dipelargonate, triethylene glycol dipelargonate, 2-butoxyethyl dipelargonate; phenoxy plasticizers such as acetyl paracumyl phenol; phosphoric acid derivatives such as tri-(2-ethylhexyl) phosphate, tributoxyethyl phosphate, triphenyl phosphate, cresyl diphenyl phosphate, tricresyl phosphate, triisopropylphenyl phosphate, alkyl aryl phosphates, diphenylxylenyl phosphate, phenyl isopropylphenyl phosphate; phthalic acid derivatives such as alkyl benzene phthalates, dimethyl phthalate, dibutyl phthalate, diisobutyl phthalate, dihexyl phthalate, butyl octyl phthalate, butyl isodecyl phthalate, butyl iso-hexyl phthalate, diisononyl phthalate, dioctyl phthalate, di-(2-ethyl hexyl) phthalate, n-octyl-n-decyl phthalate, hexyl octyl decyl phthalate, didecyl phthalate diisodecyl phthalate, diisodecyl phthalate, diundecyl phthalate, butyl-ethylhexyl phthalate, butylbenzyl phthalate, octylbenzyl phthalate, dicyclohexyl phthalate, diphenyl phthalate, alkylaryl phthalates and 2-ethylhexylisodecyl phthalate; ricinoleic acid derivatives such as methylacetyl ricinoleate, n-butyl acetyl ricinoleate, glyceryl triacetyl ricinoleate; sebacic acid derivatives such as dimethyl sebacate, dibutyl sebacate, and dibutoxyethyl sebacate; stearic acid derivatives such as glyceryl tri-acetoxy stearate, butyl acetoxy stearate, methylpentachlorostearate, and methoxyl-ethyl acetoxy stearate; sucrose derivatives such as sucrose benzoate; sulfonic acid derivatives such as alkyl-sulfonic esters of phenol; tall oil derivatives such as methylester of tall oil and isooctyl ester of tall oil; and terephthalic acid derivatives such as dioctyl terephthalate.

Such leathery compositions typically contain from about 40 to 160 parts by weight of the improved rubbery polymer of this invention, from about 10 to about 50 parts of a plasticizer and from about 0.1 to about 5 parts by weight of an antidegradant per 100 parts by weight of the polyvinylchloride. It is typically preferred for such leathery compositions to contain from about 60 to about 120 parts by weight of the improved rubbery polymer of this invention, from about 15 to about 40 parts of the plasticizer and from about 0.5 to 3 parts of an antidegradant (per 100 parts of the PVC). It is typically more preferred for the leathery composition to contain from about 70 to about 90 parts by weight of the improved rubbery polymer of this invention, from about 20 to about 30 parts by weight of the plasticizer and from about 1 to 2 parts by weight of the antidegradant per 100 parts by weight of the PVC.

Such compositions will also generally contain an acrylonitrile-butadiene-styrene resin (ABS resin). The leathery composition will typically contain from about 15 parts to about 80 parts of ABS resin per 100 parts of PVC. The leathery composition will preferably contain from about 25 to about 55 parts per weight of the ABS resin per 100 parts by weight of the PVC. It is generally more preferred for the leathery composition to contain from about 30 to about 40 parts by weight of the ABS resin per 100 parts by weight of PVC. Various colorants and/or pigments will typically also be added to the composition to attain a desired color.

The leathery compositions of this invention are useful in a wide variety of applications. For example, they have been found to be extremely valuable when used in making skins for automotive panels. Such panels are typically comprised of a semi-rigid urethane foam which is supported by a rigid backing and covered with the leathery composition of this invention. Such skins are made by calendering the leathery compositions of this invention and then cutting them to the desired size and shape. Such skins for automotive applications which are made with the leathery compositions of this invention offer outstanding heat and ultraviolet light stability. These are highly desirable characteristics which can help to prevent the skin of automotive panels from cracking during the normal life of the vehicle.

The improved rubbery polymers of this invention can also be blended with other halogen containing polymers (in addition to PVC), styrenic polymers (polymers which contain styrene, such as acrylonitrile-styrene-acrylate (ASA) polymers), polyolefins and polyamides to produce compositions which exhibit good heat and ultraviolet light resistance. Such polymeric compositions can be used in manufacturing a wide variety of useful articles, such as profiles, moldings, sheeting, flooring, wall coverings, hose, cables and footwear. Virtually any type of polyamide (nylon) can be utilized in preparing such blends. These nylons are generally prepared by reacting diamines with dicarboxylic acids. The diamines and dicarboxylic acids which are utilized in preparing such nylons will generally contain from about 2 to about 12 carbon atoms. However, nylons which can be utilized in such blends can also be prepared by addition polymerization. Some representative examples of nylons which can be used include nylon-6,6, nylon-6, nylon-7, nylon-8, nylon-9, nylon-10, nylon-11, nylon-12 and nylon-6,12. These nylons will typically have a number average molecular weight which is within the range of about 8,000 to about 40,000 and will more typically have a number average molecular weight which is within the range of about 10,000 to about 25,000. Some representative examples of polyolefins which can be used include linear low density polyethylene, high density polyethylene, polypropylene, polybutylene and modified polyolefins, such as ethylene vinyl acetate (EVA).

This invention is illustrated by the following examples which are merely for the purpose of illustration and are not to be regarded as limiting the scope of this invention or the manner in which it can be practiced. Unless specifically indicated otherwise, all parts and percentages are given by weight.

EXAMPLE 1

In this experiment, a rubbery polymer was modified with cetylalcohol utilizing the technique of this invention. In the procedure employed, 32 grams of Sunigum® 7558 rubber was fluxed in a Haake Rheocord for 20 minutes at 180° C. with 23 g of cetylalcohol and 2.2 grams of Irgastab™ T161 dioctyl tin oxide catalyst. The modified polymer produced was determined to have a glass transition temperature of −30° C. Unmodified Sunigum® 7558 rubber has a glass transition temperature of −16° C. Thus, the modification procedure lowered the glass transition temperature of the rubbery polymer by 14° C.

EXAMPLE 2

In this experiment, a rubbery polymer was modified with octanol utilizing the technique of this invention. In the procedure employed, 48.2 grams of Sunigum® 7395 rubber was fluxed in a Haake Rheocord for 60 minutes at 150° C. with 6.8 g of octanol and 1.1 grams of Irgastab™ T161 dioctyl tin oxide catalyst. The modified polymer produced was determined to have a glass transition temperature of −28° C. Unmodified Sunigum® 7395 rubber has a glass transition temperature of −15° C. Thus, the modification procedure lowered the glass transition temperature of the rubbery polymer by 13° C.

EXAMPLE 3–8

In this series of experiments, Sunigum® 7395 rubber was modified with ethylene vinyl acetate. In the procedure utilized, 27.5 grams of Sunigum® 7395 rubber was reactively processed with 27.5 grams of Elvax™ ethylene vinyl acetate copolymer in the presence of 1.1 grams of Irgastab™ dioctyl tin oxide catalyst. The reactive processing was carried out in an internal mixer at a temperature of 200° C. for 10 minutes, 20 minutes or 30 minutes as shown in Table I. The procedure was also repeated without the tin catalyst being included as a control (see Examples 6–8). The Shore A hardness, stress at 200 percent elongation, stress at maximum load and elongation at break for the polymers made is reported in Table I.

TABLE I

| Ex. | Mix Time (min.) | Shore A | Stress @ 200% (MPa) | Stress @ Break (MPa) | Elong. @ Break (MPa) |
|---|---|---|---|---|---|
| 3 | 10 | 67 ± 2 | 3.8 ± 0.1 | 5.5 ± 1.0 | 654 ± 654 |
| 4 | 20 | 67 ± 3 | 4.2 ± 0.1 | 8.6 ± 0.4 | 725 ± 19 |
| 5 | 30 | 70 ± 2 | 4.8 ± 0.1 | 9.3 ± 0.4 | 693 ± 18 |
| 6* | 10 | 66 ± 4 | 3.9 ± 0.1 | 5.1 ± 0.7 | 617 ± 148 |
| 7* | 20 | 67 ± 3 | 3.9 ± 0.1 | 5.7 ± 1.1 | 647 ± 142 |
| 8* | 30 | 67 ± 3 | 3.9 ± 0.1 | 7.3 ± 0.7 | 739 ± 16 |

*Examples 6–8 were controls since no catalyst was employed.

This experiment shows the critical nature of including a condensation catalyst in the reactive processing step and continuing the reactive processing step for a period of time which is sufficient for the condensation reaction to occur. It also shows that stress at 200 percent elongation and stress at break can be significantly increased by employing the modification technique of this invention.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a rubbery polymer having improved properties, said process comprising the steps of (1) polymerizing (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile and (d) a crosslinking agent under emulsion polymerization conditions to produce a seed polymer containing latex; (2) adding (a) styrene, (b) additional acrylonitrile and (c) additional crosslinking agent to the seed polymer containing latex under emulsion polymerization conditions which result in the formation of an emulsion containing the rubbery polymer; (3) recovering the rubbery polymer from the emulsion containing the rubbery polymer; (4) adding (a) a condensation reaction catalyst and (b) a member selected from the group consisting of fatty alcohols that contain only one hydroxyl group and ethylene vinyl acetate polymers to the rubbery polymer to produce a reactive mixture; and (5) mixing the reactive mixture for at least 1 minute at a temperature which is within the range of about 100° C. to about 300° C.

2. A process for preparing a rubbery polymer having improved properties, said process comprising grafting a fatty alcohol that contains only one hydroxyl group or a ethylene vinyl acetate polymer onto a rubbery polymer which is comprised of repeat units which are derived from (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene and (e) a crosslinking agent; wherein said grafting reaction is carried out under conditions of reactive processing for a period of at least about 1 minute at a temperature which is within the range of about 100° C. to about 300° C. in the presence of a condensation reaction catalyst.

3. A rubbery polymer having improved properties which is comprised of repeat units which are derived from (a) butyl acrylate, or optionally a mixture of butyl acrylate and 2-ethylhexyl acrylate containing up to about 40 percent 2-ethylhexyl acrylate, (b) at least one member selected from the group consisting of methyl methacrylate, ethyl methacrylate, methyl acrylate and ethyl acrylate, (c) acrylonitrile, (d) styrene, (e) a half ester maleate soap and (f) a crosslinking agent; wherein a fatty alcohol that contain only one hydroxyl group or ethylene vinyl acetate is grafted onto said rubbery polymer.

4. A rubbery polymer as specified in claim 3 having improved low temperature properties wherein a fatty alcohol is grafted onto said rubbery polymer.

5. A rubbery polymer as specified in claim 3 having improved tensile properties wherein a ethylene vinyl acetate polymer is grafted onto said rubbery polymer.

6. A process as specified in claim 1 wherein in step (1) from about 40 weight percent to about 90 weight percent butylacrylate, from about 5 weight percent to about 35 weight percent of a member selected from the group consisting of methyl methacrylate, ethyl methacrylate, methyl acrylate and ethylacrylate, from about 2 weight percent to about 25 weight percent acrylonitrile and from about 0.25 weight percent to about 6 weight percent of a crosslinking agent are polymerized.

7. A process as specified in claim 6 wherein the crosslinking agent is selected from the group consisting of difunctional acrylates, trifunctional acrylates, difunctional methacrylates, trifunctional methacrylates and divinylbenzene.

8. A process as specified in claim 7 wherein in step (2) from about 4 parts by weight to about 30 parts by weight of styrene, from about 1 part by weight to about 20 parts by weight of acrylonitrile and from about 0.01 parts by weight to about 2 parts by weight of the crosslinking agent are added to the seed polymer per 100 parts dry weight of the seed polymer.

9. A process as specified in claim 8 wherein the crosslinking agent utilized in step (1) is 1,4-butanediol dimethacrylate.

10. A process as specified in claim 9 wherein the crosslinking agent utilized in step (2) is divinylbenzene.

11. A rubbery polymer as specified in claim 4 wherein said fatty alcohol contains from about 4 to about 20 carbon atom.

12. A process as specified in claim 2 wherein said temperature is a temperature which is within the range of about 110° C. to about 280° C.

13. A process as specified in claim 2 wherein said temperature is a temperature which is within the range of about 120° C. to about 250° C.

14. A process as specified in claim 12 wherein said reactive processing is carried out for a period of about 1 minute to about 60 minutes.

15. A process as specified in claim 13 wherein said reactive processing is carried out for a period of about 3 minutes to about 30 minutes.

16. A rubbery polymer as specified in claim 3 wherein from about 1 phr to about 100 phr of fatty alcohol or ethylene vinyl acetate is grafted onto said rubbery polymer.

17. A rubbery polymer as specified in claim 3 wherein from about 15 phr to about 75 phr of fatty alcohol or ethylene vinyl acetate is grafted onto said rubbery polymer.

18. A rubbery polymer as specified in claim 5 wherein from about 15 phr to about 30 phr of the ethylene vinyl acetate polymer is grafted onto said rubbery polymer.

19. A process, specified in claim 1, wherein the condensation reaction catalyst is selected from the group consisting of protonic acids, alkali or alkoxide metals, organotin compounds and titanate compounds.

20. A process, as specified in claim 1, which further comprises mixing the reactive mixture in the presence of a carrying polymer matrix wherein the carrying polymer matrix is selected from the group consisting of polyolefins, polyolefin copolymers, halogen containing polymers, polyamides and styrenic polymers.

21. A rubbery polymer, as specified in claim 20, wherein the percent of the carrying polymer is within the range of about 5 percent to about 95 percent of the total weight of both the carrying polymer and the reactive mixture.

22. A rubbery polymer, as specified in claim 21, wherein a fatty alcohol is grafted onto said rubbery polymer.

23. A rubbery polymer, as specified in claim 21, wherein an ethylene vinyl acetate polymer is grafted onto said rubbery polymer.

* * * * *